(12) United States Patent
Burns et al.

(10) Patent No.: US 10,614,306 B2
(45) Date of Patent: Apr. 7, 2020

(54) REGISTERING THE HARVEST OF A RESOURCE USING IMAGE DATA AND METADATA

(71) Applicant: International Business Machines Corporation, Armonk, NY (US)

(72) Inventors: David R. Burns, Cary, NC (US); Gregory J. Boss, Saginaw, MI (US); Andrew R. Jones, Round Rock, TX (US); Kevin C. McConnell, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/204,211

(22) Filed: Nov. 29, 2018

(65) Prior Publication Data

US 2019/0095688 A1 Mar. 28, 2019

Related U.S. Application Data

(63) Continuation of application No. 15/244,460, filed on Aug. 23, 2016, now Pat. No. 10,169,653.

(51) Int. Cl.
*G06T 7/00* (2017.01)
*G06K 9/00* (2006.01)
(Continued)

(52) U.S. Cl.
CPC ....... *G06K 9/0063* (2013.01); *G06F 16/5866* (2019.01); *G06K 9/00671* (2013.01); *G06K 9/22* (2013.01); *G06K 2209/27* (2013.01)

(58) Field of Classification Search
CPC ............ G06K 2209/01; G06K 9/0063; G06K 2209/15; G06K 9/3258; G06K 9/4676;
(Continued)

(56) References Cited

U.S. PATENT DOCUMENTS

| 10,169,653 B2 * | 1/2019 | Boss .................... G06K 9/0063 |
| 2003/0172394 A1 * | 9/2003 | Holzer .................. A01K 67/00 800/21 |

(Continued)

OTHER PUBLICATIONS

U.S. Appl. No. 15/244,460, filed Aug. 23, 2016, U.S. Pat. No. 2018-0060644.

*Primary Examiner* — Jingge Wu
(74) *Attorney, Agent, or Firm* — Scully, Scott, Murphy & Presser, P.C.; Brian Restauro, Esq.

(57) ABSTRACT

A method, system and computer program product are disclosed for tagging a resource. In one embodiment, the method comprises receiving a given number of unique electronic tags for tagging a specified resource; for a harvested one of the specified resources, generating image data representing an image of the harvested resource, and selecting one of the electronic tags for the harvested resource; and sending the image data and data identifying the selected electronic tag to a specified entity to register the harvested resource. In an embodiment, the given number of unique physical tags are generated for the specified resource, and the generated image data include data representing one of the physical tags. In an embodiment, a mobile computing device is used to receive the electronic tags, to generate the image data, and to transmit the image data to the specified entity.

20 Claims, 7 Drawing Sheets

(51) Int. Cl.
*G06F 16/58* (2019.01)
*G06K 9/22* (2006.01)

(58) Field of Classification Search
CPC ... G06K 9/6232; G06T 7/33; G06F 17/30286; G07F 7/08; G07F 7/12
See application file for complete search history.

(56) References Cited

U.S. PATENT DOCUMENTS

| | | | |
|---|---|---|---|
| 2004/0149822 A1* | 8/2004 | Stevens | A47G 29/141 235/385 |
| 2006/0004484 A1* | 1/2006 | Hornbaker | G06K 19/04 700/225 |
| 2009/0237212 A1* | 9/2009 | Hyde | H04Q 9/00 340/10.1 |
| 2012/0011076 A1* | 1/2012 | Crissy | G06Q 10/10 705/311 |
| 2015/0312725 A1* | 10/2015 | Torii | H04W 4/043 455/456.1 |
| 2016/0192188 A1* | 6/2016 | Coulier | H04W 12/04 |
| 2016/0252325 A1* | 9/2016 | Sammut | F41G 1/38 42/122 |
| 2017/0220985 A1* | 8/2017 | White | G06Q 10/08 |
| 2017/0249308 A1* | 8/2017 | Cronin | H04L 51/32 |

\* cited by examiner

REGISTERING THE HARVEST OF A RESOURCE USING IMAGE DATA AND METADATA

CROSS-REFERENCE TO RELATED APPLICATION

This application is a continuation of copending U.S. patent application Ser. No. 15/244,460, filed Aug. 23, 2016, the entire contents and disclosure of which are hereby incorporated by reference herein.

BACKGROUND

This invention generally relates to registering the harvest of a resource, and more specifically to using a mobile device camera to register the harvest of a resource.

Fishing and hunting, as well as other ways of harvesting resources, are commonly regulated by various government agencies. For example, these regulations may restrict hunting or fishing for particular animals or fish to certain times of the year, or may set limits on the amount or number of fish or animals that may be caught or hunted. Other rules, restrictions and limitations may also apply. In some instance, the rules and regulations may be based on incomplete or inaccurate data.

For instance, in the Gulf of Mexico, the National Marine Fisheries Council under the U.S. Department of Commerce for the year 2016 has evenly divided the Red Snapper fishing limits between commercial fisherman and sport fisherman, fifty percent/fifty percent. This rule allows the commercial fishermen to fish three hundred and sixty-five days a year, and the sport fishermen are granted eight days a year to fish. The Council believes that the sport fishermen catch their quota in these eight days with limited real data to prove this. This eight day season starting June first, prohibits a large majority of sport fishermen from participating because of weather conditions and family and school requirements.

SUMMARY

Embodiments of the invention provide a method, system and computer program product for tagging a resource. In one embodiment, the method comprise receiving a given number of unique electronic tags for tagging a specified resource; for a harvested one of the specified resources, generating image data representing an image of the harvested one of the specified resources, and selecting one of the electronic tags for said harvested one of the specified resources; and sending said image data and data identifying said selected one of the electronic tags to a specified entity to register the harvested one of the resources.

Embodiments of the invention provide an Internet and mobile device enabled resource tagging method.

Embodiments of the invention enable a computer generated tag that facilitates tracking the harvest of a resource using Internet and mobile computing technologies.

Embodiments of the invention combine unique Quick Response (QR) Code, with superimposed QR Code, GPS, Date, Time measurement data on a photo for uniquely identifying a resource.

Embodiments of the invention provide a number of important advantages. For example, embodiments of the invention are economically viable to deploy and manage, as there are no physical items for a central governance entity to produce, distribute or collect. Also, embodiments of the invention can be created and run in a cloud computing environment, requiring no additional physical hardware or equipment. Embodiments of the invention enable an exact count of a resource being harvested and can be provided to governing entities world-wide. In addition, analytics and image classification can provide governing entities with insights into resources that those entities have never had before.

DETAILED DESCRIPTION

Figure 1:
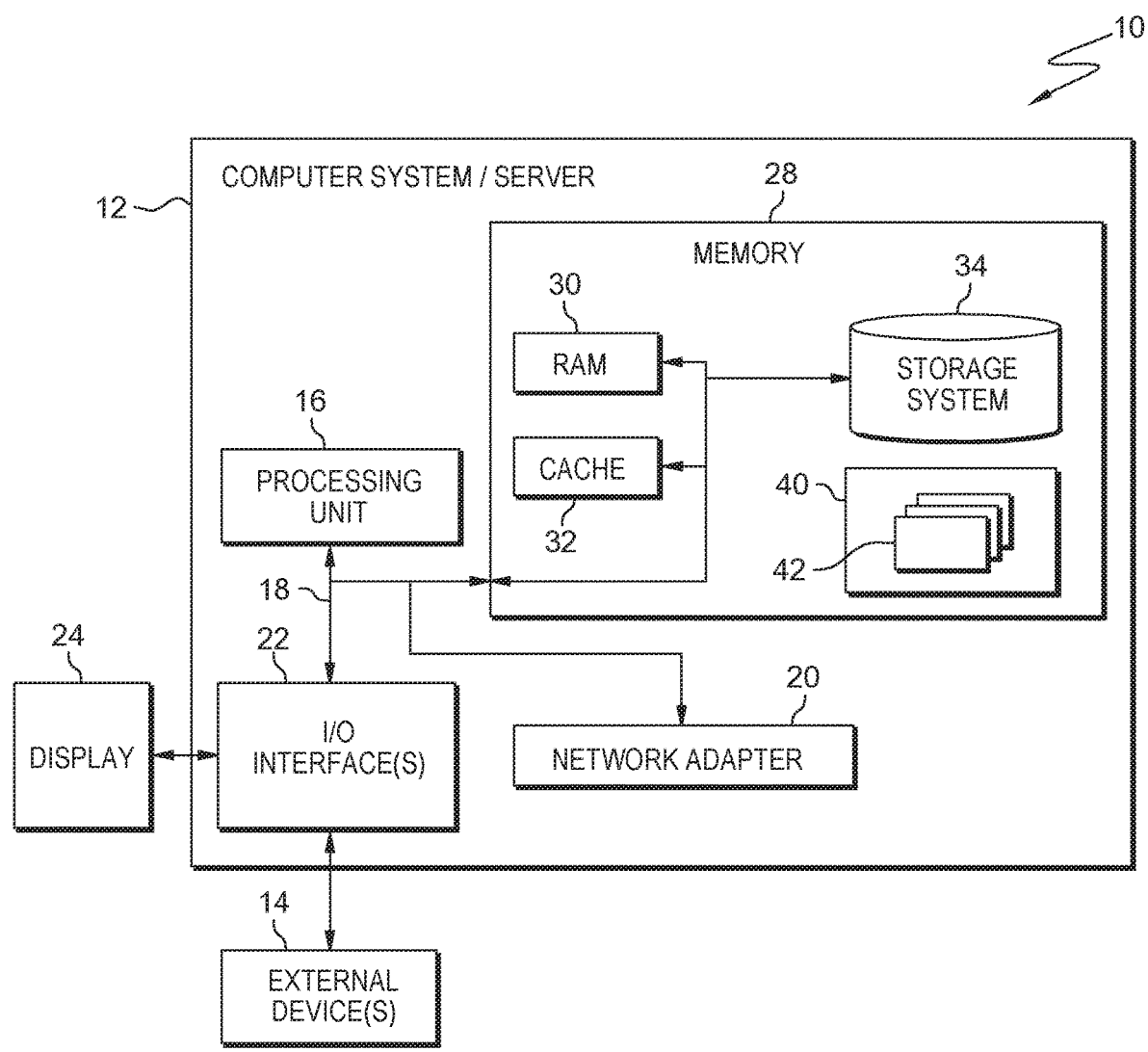
FIG. 1 depicts a cloud computing node according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
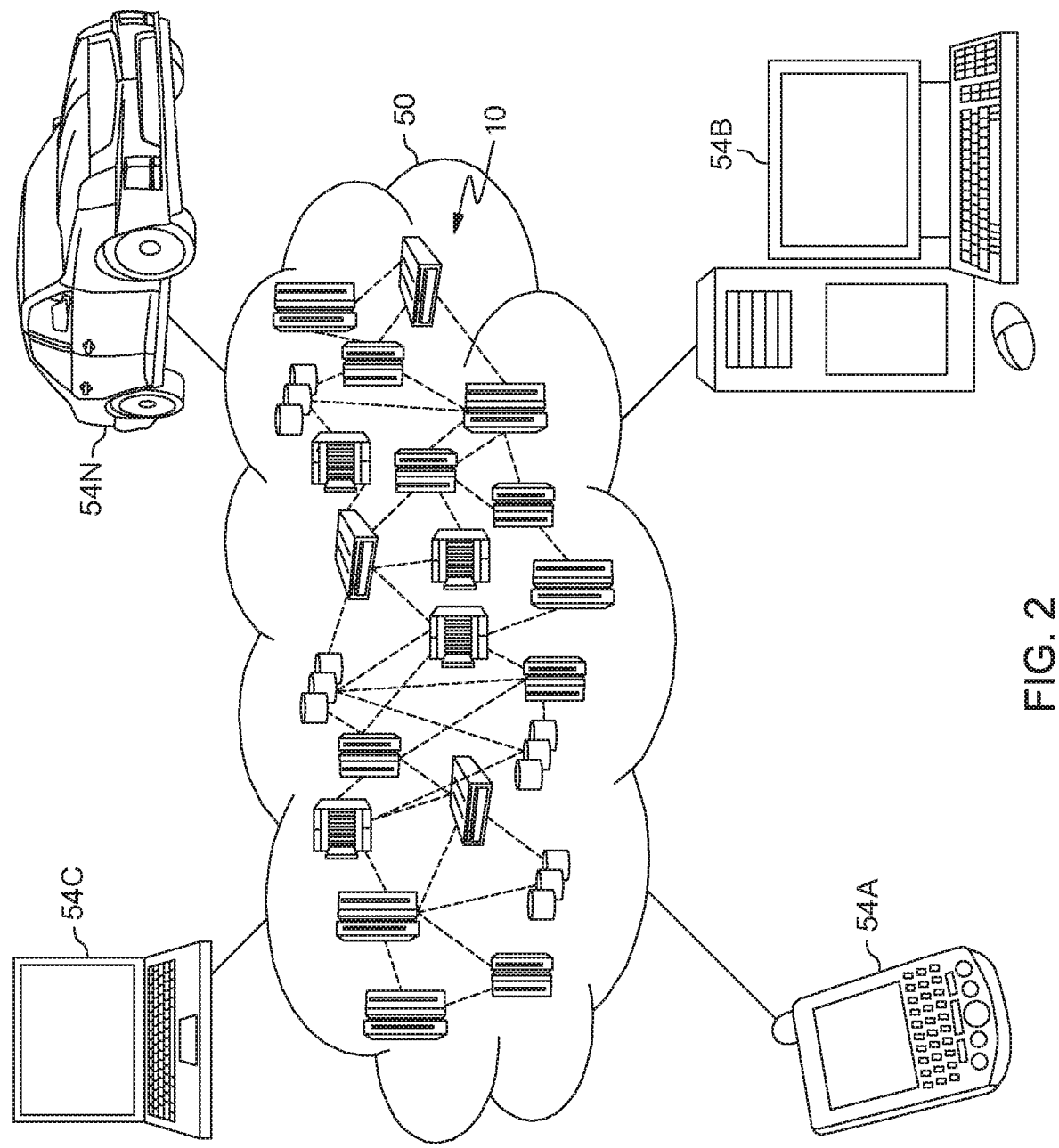
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
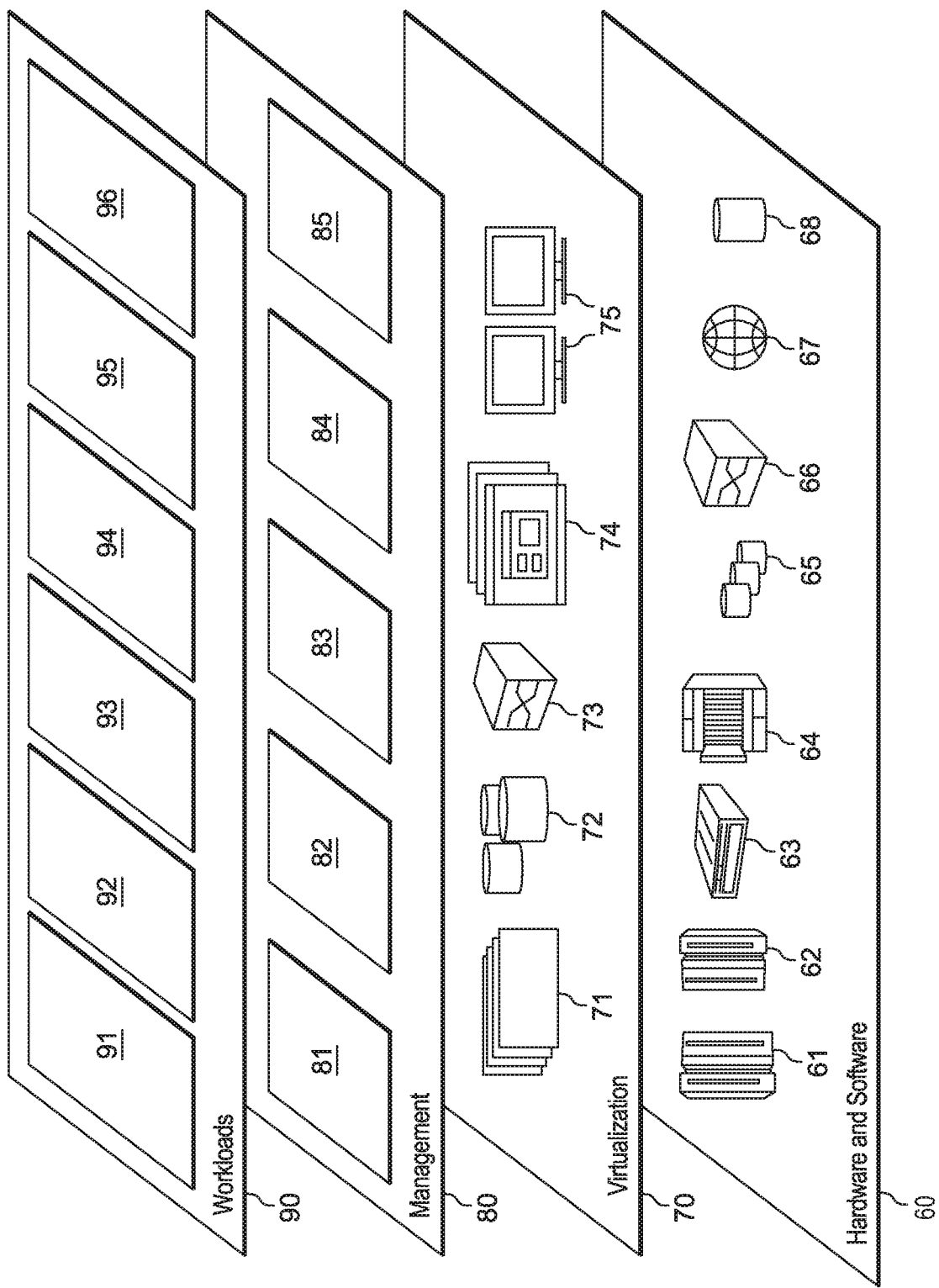
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto.

As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and registering the harvest of a resource 96.

Embodiments of the invention use aspects of cloud computing and a mobile device camera to register the harvest of a resource by, for instance, fishing or hunting. As mentioned above, fishing and hunting, as well as other ways of harvesting resources, are commonly regulated by various government agencies. For example, these regulations may restrict hunting or fishing for particular animals or fish to certain times of the year, or may set limits on the amount or number of fish or animals that may be caught or hunted. Other rules, restrictions and limitations may also apply. In some instance, the rules and regulations may be based on incomplete or inaccurate data.

Embodiments of the invention address this issue. Embodiments of the invention provide an economically feasible tagging method to accurately account for the actual harvest and to enable an equitable individual harvest quota. In the case of fishing, embodiments of the invention enable a three hundred sixty-five day season to allow private boat owners to go offshore on days when it is safe to do so.

Generally, this is done by enabling a computer generated tag that facilitates tracking the harvest of a resource using the Internet and mobile computing technologies.

Figure 4:
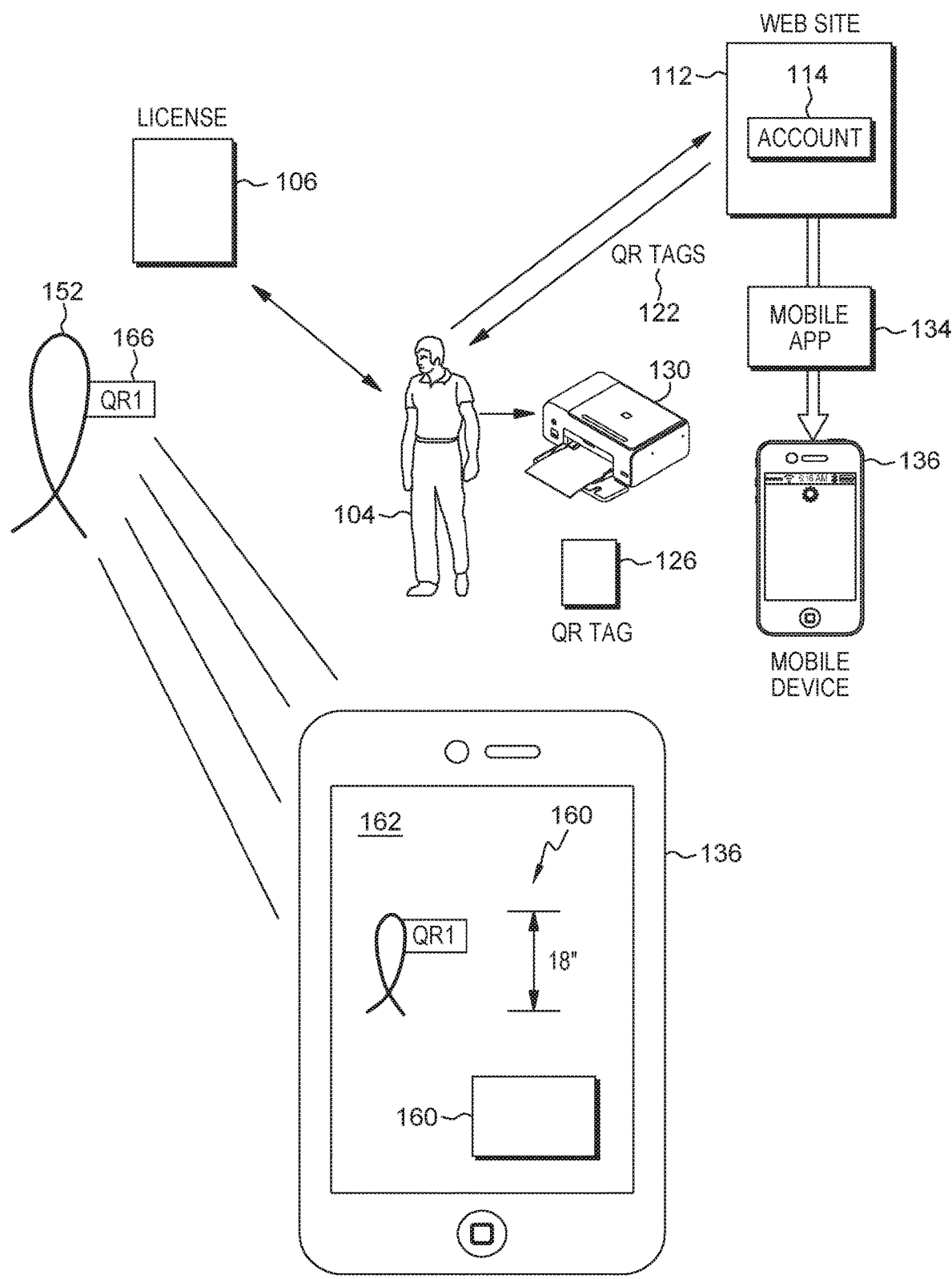
FIG. 4 illustrates a method and system in accordance with an embodiment of the invention.
Figure 5:
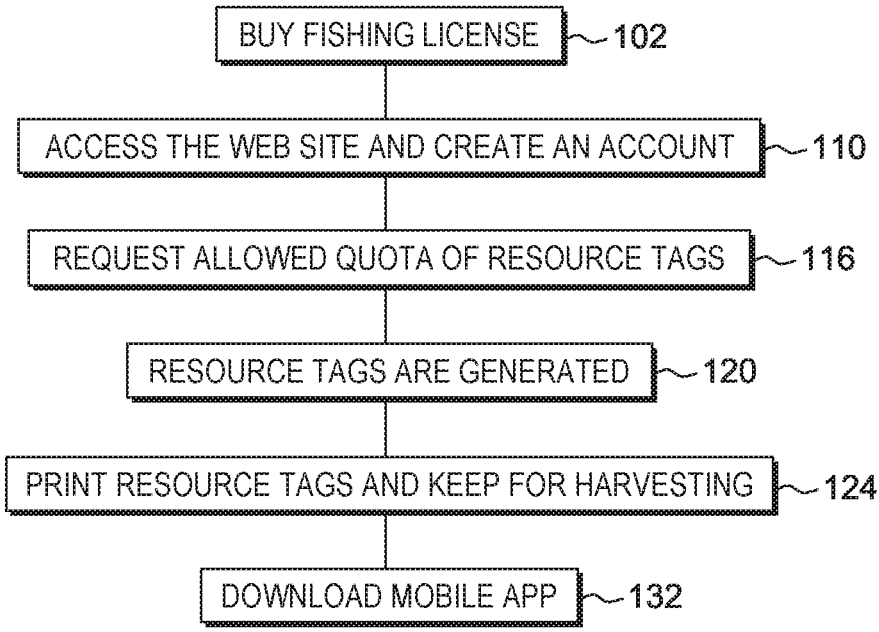
FIG. 5 shows a method for setting up a mobile computing device to implement an embodiment of the invention.

FIG. 4 illustrates a method and system in accordance with an embodiment of the invention. FIG. 5 shows a method for setting up a mobile computing device to implement an embodiment of the invention, and FIG. 6 illustrates the use of an embodiment of the invention to register the harvest of a resource.

With reference to FIGS. 4 and 5, at 102, an individual 104 buys a fishing license 106 from the state they reside in. This license has a unique number associated with the individual. (Other unique individual identifiers could be used such as a driver's license number.) At 110, the individual 104 accesses an Internet web site 112 and creates an account 114; and the individual, at 116, requests the allowed quota of resource tags, or Quick Response (QR) codes, for the calendar year. At 120 a system at the web site uses the unique attributes of the individual to generate a specific number of resource tags. Each of these tags includes specified information or data. For example, each tag may include the fishing license number, an email address and a zip code of the individual, and each tag may also include the year. In this example, sixteen QR codes are generated, and these codes are sent to the user, at 122. At 124, copies of the tags 126 are printed, at printer 130, by the individual and kept for harvest logging. These codes could vary in size and how they are printed and cut out. At 132, the individual downloads a mobile application 134 onto mobile device 136 for recording harvest.

Figure 6:
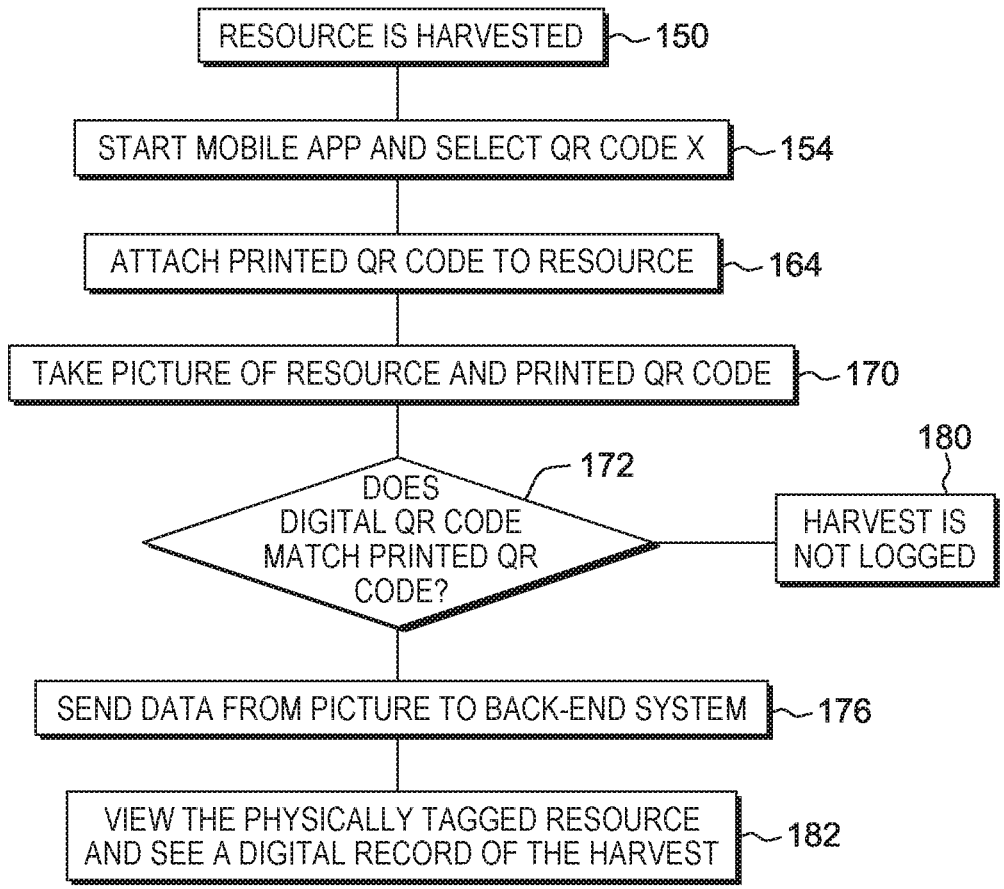
FIG. 6 illustrates a procedure to register the harvest of a resource in accordance with an embodiment of the invention.

FIGS. 4 and 6 show the use of an embodiment of the invention to register the harvest of a resource. At 150, a legal resource 152 is harvested; and at 154, the individual starts the mobile application 134 on device 136 and selects one of the QR codes, such as the QR code number one, to record the harvest.

As represented at 160, metadata are superimposed onto a camera image 162 before a picture is taken of the harvested resource 152. In an embodiment of the invention, as an example, this metadata 160 includes QR code number one, a dynamic ruler to measure the length of the resource, a GPS position, and the date and time. The GPS position shown on the camera image could be the position of the device 130, or could be another position, within a specified distance of device 136, as to not give away the exact location at which the resource was harvested.

At 164, the printed copy 166 of QR code number one is attached to the resource 152 with, for example, a staple gun or twist tie; and at 170, the mobile application 134 on device 136 takes a picture of the resource and the printed QR code. If, at 172, the digital QR code matches the physical printed QR code, the data collected from each picture are sent, at 176, over the Internet to a back-end system for logging, historical tracking and analytics. If the mobile device is out of range of a network, the data are stored and sent when network connectivity is regained. If, at 172, the digital QR code does not match the physical printed QR code, the system prevents the logging of the harvest, as shown at 180.

As represented at 182, law enforcement, or other governmental agency, can now view the physically tagged resource and see a digital record of the harvest and can tell exactly how many tags an individual has used and has left. The method can now accurately track and record a harvested resource.

The above example is used to track a particular type of fish, and embodiments of the invention can be used to track a wide range and variety of resources.

As an alternative, the physical tag 166 can be eliminated from the method, and the method can rely only on the digital images. This alternative can be used to register the number of fish or animals caught. For example, a person could catch four fish, and take four pictures of one of the fish, using four QR tags. This would give an accurate indication of the number of resources harvested, although it might not give accurate data as to the ages and sizes of the resources harvested.

Embodiments of the invention provide a number of important advantages. For example, embodiments of the invention are economically viable to deploy and manage, as there are no physical items for a central governance entity to produce, distribute or collect. Also, embodiments of the invention can be created and run in a cloud computing environment, requiring no additional physical hardware or equipment. Embodiments of the invention enable an exact count of a resource being harvested and can be provided to governing entities world-wide. In addition, analytics and image classification can provide governing entities with insights into resources that those entities have never had before.

Figure 7:
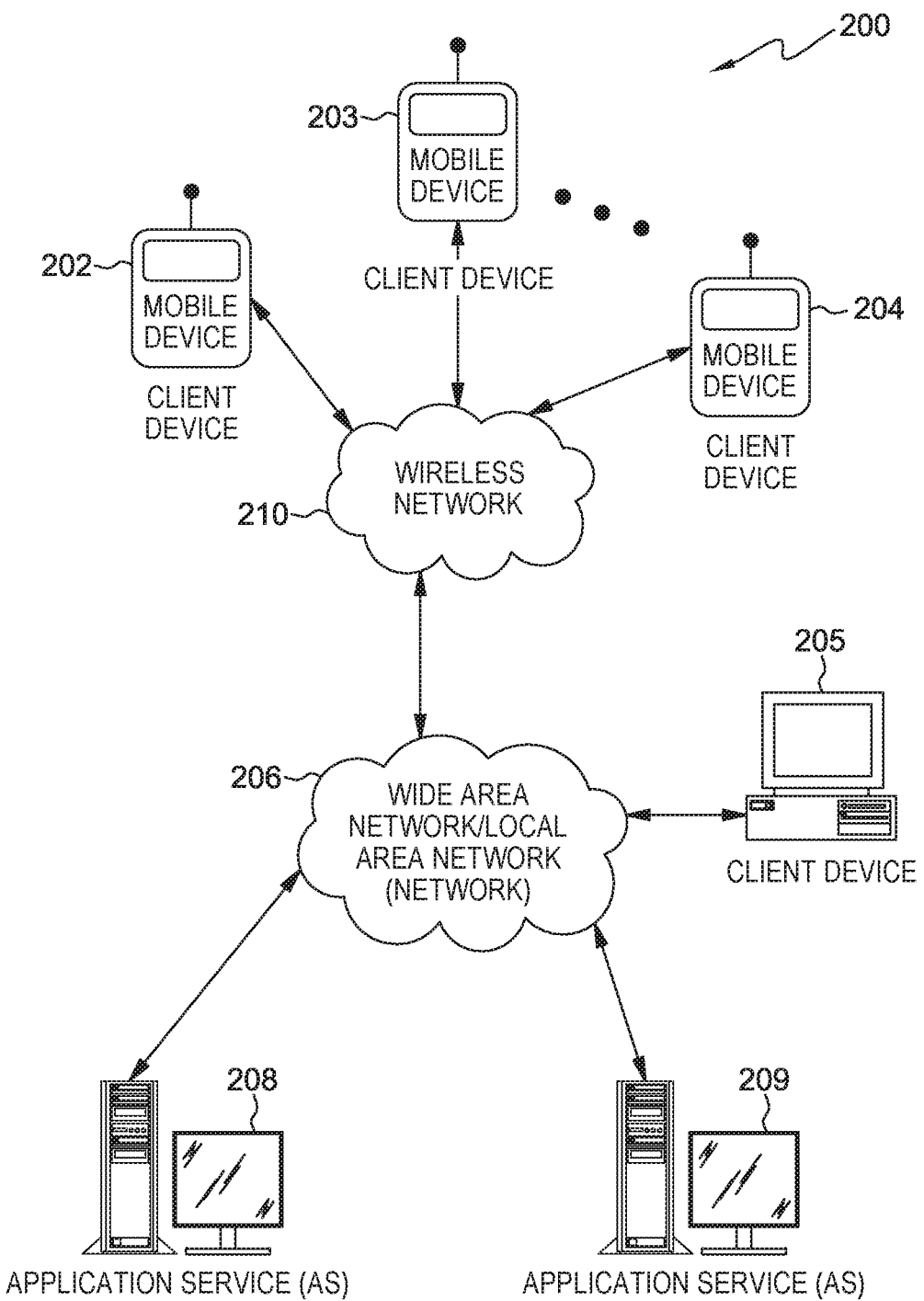
FIG. 7 shows an exemplary network environment in which the invention may be practiced.

FIG. 7 shows components of an exemplary environment 200 in which the invention may be practiced. Not all the illustrated components may be required to practice the invention, and variations in the arrangement and type of the components may be made without departing from the spirit or scope of the invention. As shown, system 200 of FIG. 7 includes local area networks ("LANs")/wide area network 206, wireless network 210, mobile devices 202-204, client device 205, and application services (AS) 208-209.

Generally, mobile devices 202-204 may include virtually any portable computing device that includes a camera and that is capable of receiving and sending a message over a network, such as networks 206 and wireless network 210. Such devices include portable devices, such as cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 202-204 typically range widely in terms of capabilities and features.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 202-204 may each receive messages sent from AS 208-209, from one of the other mobile devices 202-204, or even from another computing device. Mobile devices 202-204 may also send messages to one of AS 208-209, to other mobile devices, or to client device 205, or the like. Mobile devices 202-204 may also communicate with non-mobile client devices, such as client device 205, or the like.

Wireless network 210 is configured to couple mobile devices 202-204 and its components with network 206. Wireless network 210 may include any of a variety of wireless sub-networks that may further overlay stand-alone ad-hoc networks, and the like, to provide an infrastructure-oriented connection for mobile devices 202-204. Such sub-networks may include mesh networks, Wireless LAN (WLAN) networks, cellular networks, and the like.

Network 206 is enabled to employ any form of computer readable media for communicating information from one electronic device to another. Also, network 206 can include the Internet in addition to local area networks (LANs), wide area networks (WANs), direct connections, such as through a universal serial bus (USB) port, other forms of computer-readable media, or any combination thereof.

AS 208-209 include virtually any device that may be configured to provide an application service. Such application services or simply applications include, but are not limited to, email applications, search applications, video applications, audio applications, graphic applications, social networking applications, text message applications, or the like. In one embodiment, AS 208-209 may operate as a web server. However, AS 308-309 are not limited to web servers.

Those of ordinary skill in the art will appreciate that the architecture and hardware depicted in FIG. 7 may vary.

Figure 8:
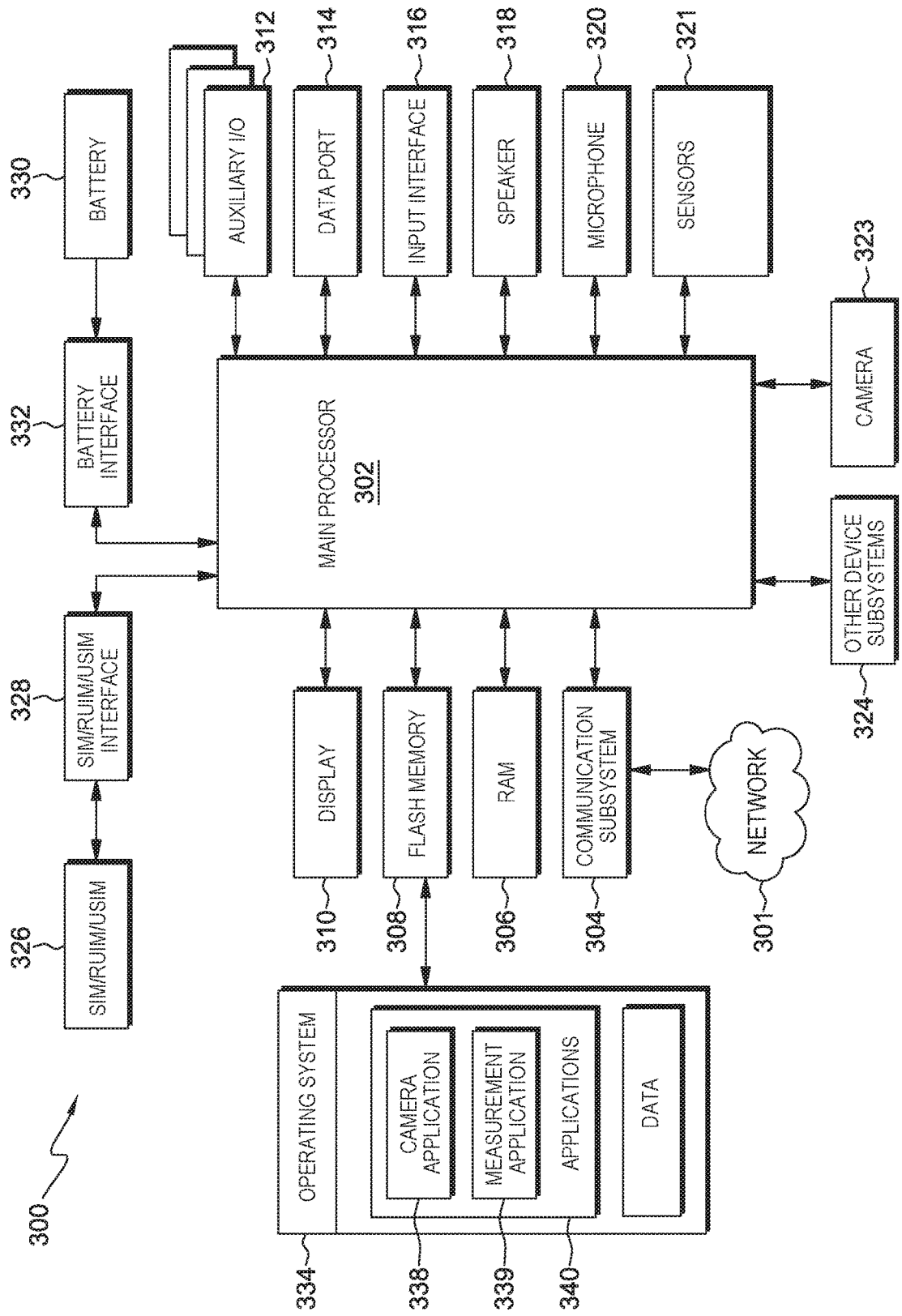
FIG. 8 illustrates an example mobile communication device which can be used in embodiments of the invention.

FIG. 8 illustrates in more detail an example mobile communication device 300, which can be used in embodiments of the invention. Mobile communication device 300 can be any suitable type of mobile communication device that includes a camera. In the embodiment disclosed in FIG. 8, mobile communication device 300 is a wireless mobile telephone or tablet capable of operating in both wide-area cellular networks and in a variety of short-range networks, such as local area networks (LANs), WiFi, Bluetooth, etc. Mobile communication device 300 can also be a personal digital assistant (PDA), e-reader, or other mobile electronic device that contains a camera.

Mobile communication device 300 comprises a number of components including a main processor 302 that controls the overall operation of mobile communication device 300. Communication functions, which include data communications and can also include voice communications, are performed through communication subsystem 304. Communication subsystem 304 receives messages from and sends messages to a wireless network 301. In this example embodiment of mobile communication device 300, communication subsystem 304 is configured in accordance with the Global System for Mobile Communication (GSM) and General Packet Radio Services (GPRS) standards, which is used worldwide. Other communication configurations that are also applicable are the 3G and 4G networks such as EDGE, UMTS and HSDPA, LTE, Wi-Max etc.

New standards are still being defined, and persons skilled in the art will understand that the embodiments described herein are intended to use any other suitable standards that are developed in the future. The wireless link connecting communication subsystem 304 with wireless network 301 represents one or more different Radio Frequency (RF) channels, operating according to defined protocols specified for GSM/GPRS communications.

Main processor 302 also interacts with additional subsystems such as Random Access Memory (RAM) 306, flash memory 308, display 310, auxiliary input/output (I/O) subsystem 312, data port 314, input interface 316, speaker 318, microphone 320, camera 323, sensors 321, and other device subsystems 324. Sensors 321 can include an accelerometer, tilt sensor, proximity sensor, magnetometer, pressure sensor (none of which are specifically shown). The display 310 can be a touch-screen display able to receive inputs through a user's touch. Some of the subsystems of mobile communication device 300 perform communication-related functions, whereas other subsystems may provide resident or on-device functions. By way of example, display 310 and input interface 316 may be used for both communication-related functions, such as entering a text message for transmission over wireless network 301, and device-resident functions such as a calculator or task list.

Mobile communication device 300 can send and receive communication signals over wireless network 301 after required network registration or activation procedures have been completed. Network access is associated with a subscriber or user of mobile communication device 300. To identify a subscriber, mobile communication device 300 may use a subscriber module component or smart card 326, such as a Subscriber Identity Module (SIM), a Removable User Identity Module (RUIM) and a Universal Subscriber Identity Module (USIM). In the example shown, SIM/RUIM/USIM 326 is inserted into SIM/RUIM/USIM interface 328 in order to communicate with a network. Once SIM/RUIM/USIM 326 is inserted into SIM/RUIM/USIM interface 328, it is coupled to main processor 302.

Mobile communication device 300 is a battery-powered device and includes battery interface 332 for receiving one or more rechargeable batteries 330. In at least some embodiments, battery 130 can be a smart battery with an embedded microprocessor. Battery interface 332 is coupled to a regulator (not shown), which assists battery 330 in providing power to mobile communication device 300. Although current technology makes use of a battery, future technologies such as micro fuel cells may provide power to mobile communication device 300.

The description of the invention has been presented for purposes of illustration and description, and is not intended to be exhaustive or to limit the invention in the form disclosed. Many modifications and variations will be apparent to those of ordinary skill in the art without departing from the scope of the invention. The embodiments were chosen and described in order to explain the principles and applications of the invention, and to enable others of ordinary skill in the art to understand the invention. The invention may be implemented in various embodiments with various modifications as are suited to a particular contemplated use.

The invention claimed is:

1. A method of registering a harvested resource, comprising:

a user receiving a given number of unique electronic tags for tagging harvested ones of a specified resource; and the user registering with a specified entity a harvested one of the specified resource, including for the harvested one of the specified resource, generating image data representing an image of the harvested one of the specified resource, and selecting one of the electronic tags for said harvested one of the specified resource; and sending said image data and data identifying said selected one of the electronic tags from a specified mobile computing device to the specified entity to register the harvested one of the resource with said specified entity; and wherein:

the generating image data representing an image of the harvested one of the specified resource includes capturing the image of the harvested one of the specified resource; and the sending said image data and data identifying said selected one of the electronic tags from a specified mobile computing device to the specified entity includes:

superimposing specified metadata on the captured image of the harvested one of the specified resource, and sending to the specified entity, said metadata with said image data.

2. The method according to claim 1, further comprising: generating said given number of unique physical tags for the specified resource; and wherein the generating image data representing an image of the harvested one of the resources comprises including in the image data physical tag data representing one of the physical tags for the harvested one of the resources.

3. The method according to claim 2, further comprising attaching said one of the physical tags to the harvested one of the resources.

4. The method according to claim 3, wherein the generating image data representing an image of the harvested one of the resources includes capturing an image of the harvested one of the resources with said one of the physical tags attached to the harvested one of the resources.

5. A method of registering a harvested resource, comprising:
- a user receiving a given number of unique electronic tags for tagging harvested ones of a specified resource;
- the user registering with a specified entity a harvested one of the specified resource, including
  - for the harvested one of the specified resources, generating image data representing an image of the harvested one of the specified resources, and selecting one of the electronic tags for said harvested one of the specified resources;
  - sending said image data and data identifying said selected one of the electronic tags from a specified mobile computing device to the specified entity to register the harvested one of the resources with said specified entity;
- generating said given number of unique physical tags for the specified resource; and
- attaching said one of the physical tags to the harvested one of the resources; and wherein:
  - the generating image data representing an image of the harvested one of the resources comprises including in the image data physical tag data representing one of the physical tags for the harvested one of the resources;
  - the generating image data representing an image of the harvested one of the resources includes capturing an image of the harvested one of the resources with said one of the physical tags attached to the harvested one of the resources;
  - each of the physical tags matches a respective one of the electronic tags; and
  - the method further comprises comparing the physical tag attached to the harvested one of the resources to the selected one of the electronic tags to determine if the physical tag attached to the harvested one of the resources matches the selected one of the electronic tags.

6. The method according to claim 1, wherein the generating image data representing an image of the harvested one of the resources comprises including in the image data defined data identifying a specified person.

7. The method according to claim 1, wherein:
- the receiving a given number of electronic tags for tagging a specified resource includes receiving said given number of electronic tags on the specified mobile computing device; and
- the generating image data representing an image of the harvested one of the resources includes using said specified mobile computing device to generate said image data.

8. The method according to claim 7, wherein the using said specified mobile computing device to generate said image data includes using said specified mobile computing device to capture an image of the harvested one of the resources.

9. The method according to claim 8, wherein the sending said image data and data identifying said selected one of the electronic tags includes using said specified mobile computing device to send said image data and data identifying said selected one of the electronic tags to the specified entity.

10. A mobile computing system for registering a harvested resource, comprising:
- an electronic data receiver for receiving for a user a given number of unique electronic tags for tagging harvested ones of a specified resource;
- an electronic image data generator and an electronic data transmitter for the user for registering with a specified entity a harvested one of the specified resource, including
- the electronic image data generator for generating, for the harvested one of the specified resources, image data representing an image of the harvested one of the specified resources, and for selecting one of the electronic tags for said harvested one of the specified resources; and
- the electronic data transmitter for sending said image data and data identifying said selected one of the electronic tags from the mobile computing system to the specified entity to register the harvested one of the resources with said specified entity; and wherein:
  - the generating image data representing an image of the harvested one of the specified resource includes capturing the image of the harvested one of the specified resource; and
  - the sending said image data and data identifying said selected one of the electronic tags from a specified mobile computing device to the specified entity includes:
    - superimposing specified metadata on the captured image of the harvested one of the specified resource, and
    - sending to the specified entity, said metadata with said image data.

11. The system according to claim 10, further comprising:
a physical tag generator for generating said given number of unique physical tags for the specified resource; and
wherein the generating image data representing an image of the harvested one of the resources comprises including in the image data physical tag data representing one of the physical tags for the harvested one of the resources.

12. The system according to claim 11, wherein the generating image data representing an image of the harvested one of the resources includes capturing an image of the harvested one of the resources with one of the physical tags attached to the harvested one of the resources.

13. The system according to claim 11, wherein:
each of the physical tags matches a respective one of the electronic tags; and
the system further comprises a processor unit for comparing the physical tag attached to the harvested one of the resources to the selected one of the electronic tags to determine if the physical tag attached to the harvested one of the resources matches the selected one of the electronic tags.

14. The system according to claim 10, wherein the receiver, the image generator, and the transmitter are components of a specified mobile computing device.

15. A computer program product for registering a harvested resource, the computer program product comprising a computer readable hardware storage medium having program instructions embodied therein, the program instructions executable by a computer to operate the computer for:
   receiving for a user a given number of unique electronic tags for tagging a specified resource; and
   registering, for the user, with a specified entity a harvested one of the specified resource including
      for the harvested one of the specified resources, generating image data representing an image of the harvested one of the specified resources, and selecting one of the electronic tags for said harvested one of the specified resources; and
      sending said image data and data identifying said selected one of the electronic tags from a specified mobile computing device to the specified entity to register the harvested one of the resources with said specified entity; and wherein:
         the generating image data representing an image of the harvested one of the specified resource includes capturing the image of the harvested one of the specified resource; and
         the sending said image data and data identifying said selected one of the electronic tags from a specified mobile computing device to the specified entity includes:
            superimposing specified metadata on the captured image of the harvested one of the specified resource, and
            sending to the specified entity, said metadata with said image data.

16. The computer program product according to claim 15, wherein:
   the program instructions further cause the computer to generate said given number of unique physical tags for the specified resource; and
   the generating image data representing an image of the harvested one of the resources comprises including in the image data physical tag data representing one of the physical tags for the harvested one of the resources.

17. The computer program product according to claim 16, wherein the generating image data representing an image of the harvested one of the resources includes capturing an image of the harvested one of the resources with one of the physical tags attached to the harvested one of the resources.

18. The computer program product according to claim 17, wherein:
   each of the physical tags matches a respective one of the electronic tags; and
   the program instructions are executable by the computer to operate the computer for comparing the physical tag attached to the harvested one of the resources to the selected one of the electronic tags to determine if the physical tag attached to the harvested one of the resources matches the selected one of the electronic tags.

19. The computer program product according to claim 15, wherein the generating image data representing an image of the harvested one of the resources comprises including in the image data defined data identifying a specified person.

20. The method according to claim 1, wherein:
   the specified metadata includes a code number of the one of the electronic tags, and a position of the specified mobile computing device; and
   the sending to the specified entity, said metadata with said image data includes sending to the specified entity, with said image data, said code number and data identifying the position of the mobile computing device.

* * * * *